United States Patent [19]
Nayyar et al.

[11] Patent Number: 5,853,785
[45] Date of Patent: *Dec. 29, 1998

[54] DRY MIX FOR PRODUCING A SLUSH BEVERAGE

[75] Inventors: Dalip K. Nayyar, Washingtonville; Walter W. Schulok, Stony Point; Fouad Z. Saleeb, Pleasantville; Eileen M. Modesta, Peekskill, all of N.Y.

[73] Assignee: Kraft Foods Inc., Northfield, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 704,183

[22] Filed: Aug. 28, 1996

[51] Int. Cl.$^6$ .................................................. A23L 2/121
[52] U.S. Cl. .......................... 426/565; 426/567; 426/569; 426/591; 426/599
[58] Field of Search ..................................... 426/564, 565, 426/567, 569, 100, 101, 591, 477, 590, 599

[56] References Cited

U.S. PATENT DOCUMENTS

| | | | |
|---|---|---|---|
| 1,167,563 | 8/1916 | Ingram | 426/599 |
| 2,395,060 | 2/1946 | Musher | 426/567 |
| 2,431,704 | 12/1947 | Musher | 426/567 |
| 2,603,569 | 7/1952 | Alther et al. | 426/590 |
| 2,863,776 | 12/1958 | Lisher | 426/599 |
| 3,073,703 | 1/1963 | Dunn et al. | 99/192 |
| 3,476,571 | 11/1969 | Block et al. | 99/130 |
| 3,525,624 | 8/1970 | Rubenstein | 426/590 |
| 3,607,307 | 9/1971 | Peyser | 99/171 |
| 3,608,779 | 9/1971 | Cornelius | 426/477 |
| 3,619,205 | 11/1971 | LeVan | 426/590 |
| 3,647,472 | 3/1972 | Speech et al. | 426/590 |
| 3,826,829 | 7/1974 | Marulich | 426/190 |
| 3,897,571 | 7/1975 | Homler et al. | 426/580 |
| 3,922,361 | 11/1975 | Vann | 426/599 |
| 3,922,371 | 11/1975 | Julien | 426/599 |
| 3,968,266 | 7/1976 | Baugher | 426/566 |
| 3,987,211 | 10/1976 | Dunn et al. | 426/590 |
| 4,039,693 | 8/1977 | Adams et al. | 426/569 |
| 4,235,936 | 11/1980 | Kahn et al. | 426/330.3 |
| 4,278,695 | 7/1981 | Velasco | 426/590 |
| 4,609,561 | 9/1986 | Wade et al. | 426/599 |
| 4,619,833 | 10/1986 | Anderson | 426/568 |
| 4,724,153 | 2/1988 | Dulin et al. | 426/565 |
| 4,738,857 | 4/1988 | Daher et al. | 426/102 |
| 4,790,999 | 12/1988 | Ashmont et al. | 426/592 |
| 4,808,428 | 2/1989 | Forsstrom et al. | 426/569 |
| 4,816,283 | 3/1989 | Wade et al. | 426/599 |
| 4,828,866 | 5/1989 | Wade et al. | 426/599 |
| 4,830,868 | 5/1989 | Wade et al. | 426/599 |
| 4,986,994 | 1/1991 | Baccus, Jr. | 426/590 |
| 5,006,359 | 4/1991 | Senda | 426/569 |
| 5,069,924 | 12/1991 | Baccus, Jr. | 426/590 |
| 5,102,682 | 4/1992 | Nasrallah et al. | 426/590 |
| 5,366,755 | 11/1994 | Timonen et al. | 426/658 |
| 5,407,694 | 4/1995 | Devine et al. | 426/599 |

OTHER PUBLICATIONS

The Merck Index, Tenth Edition (1983), "Quillaja", p. 1161 (Merck & Co., Inc. Rahway, N.J.).

*Primary Examiner*—Cynthia L. Nessler
*Attorney, Agent, or Firm*—Thomas R. Savoie; Thomas A. Marcoux

[57] ABSTRACT

A dry mix for preparing a slush beverage. When the dry mix is dissolved in water at a 15% solids level, the liquid has an onset melting point greater than −6.5° C. and a viscosity of less than 10 mPas at 14.7° C. The mix contains at least 2% of water-soluble, low-viscosity hydrocolloid and preferably contains insoluble particles to function as an ice crystal nucleating agent.

17 Claims, No Drawings

DRY MIX FOR PRODUCING A SLUSH BEVERAGE

BACKGROUND OF THE INVENTION

Soft-frozen slush products containing ice crystals have attained wide consumer acceptance. Commercial methods and equipment have been developed to produce and dispense slush products for consumption at or near the place of sale. These slush products are composed of ice crystals distributed throughout a sweetened and flavored aqueous matrix and typically have both a refreshing and cooling effect and good eye appeal.

The disadvantages of commercial slush products include their need for constant mechanical agitation in order to prevent agglomeration of the ice crystals prior to sale and the inability to obtain the slush product outside of the commercial setting (e.g., convenience stores). These products have also been found to contain relatively coarse ice crystals and usually these products are not sufficiently fluid that they can be consumed through a straw.

Consequently, there has existed a need for products, which can be conveniently converted to a slush beverage in a home freezer. Such a slush beverage should be composed of a large quantity of small ice crystals. The ice crystals should be sufficiently small that the slush has a smooth texture and can be consumed through a straw at a temperature of about −3.9° C. (25° F.).

Prior art exists, such as U.S. Pat. No. 3,826,829, hereby incorporated by reference, describing a liquid which can be consumed as a ready-to-drink beverage or which can be transformed into a slush beverage by placing the liquid in a home freezer. This patent, and other similar prior art disclosures, include within the formulation ingredients, such as ethyl alcohol and/or polyhydric alcohols (e.g., glycerol), which could be seen as either incompatible with products designed for children and/or known to impart an undesirable taste. These low-molecular weight alcohols, as well as other known freezing point depressants, also prolong the time needed to obtain a slush.

SUMMARY OF INVENTION

The dry mixes of this invention may be formulated to be combined with water and/or milk. As used herein milk could be skim, low-fat or whole milk. When combined with water the resulting liquid should have a solid content of from 13–30%, preferably 14–20% and most preferably 14–18%, and be consumable as a liquid beverage. At a 15% solids level a water solution of the mix should have an onset melting point greater than −6.5° C. (20.3° F.), preferably −5.5° C. (22.1° F.) to −1.0° C. (30.2° F.), and most preferably −4.5° C. (23.9° F.) to 1.0° C. (30.2° F.), a viscosity at 14.7° C. (58.5° F.) of less than 15 mpas, preferably less than 10 mPas and most preferably less than 5 mpas, and a freezable water content of at least 67%, preferably at least 70%.

The dry mix upon combination with the appropriate amount of water or milk produces a liquid which will freeze to a fine-grained slush consistency within about 3.5 hours in a household freezer. Naturally, timing will be dependent on the temperature setting and efficiency of the freezer used as well as the shape and volume of the liquid. Preferred recipe directions include one shaking during freezing to break up the frozen mixture and a further shaking of the frozen slush upon removal from the freezer before spooning into serving containers, such as cups.

If the liquid slush formulation (i.e., dry mix plus water and/or milk) is left in the freezer for a prolonged period (overnight or longer) it will freeze solid, however, upon removal from the freezer and allowed to warm, a fine-grained slush is once again obtained. Warming can be done on the countertop or in a microwave oven until the desired consistency is reached. Warming should be accompanied by at least one period of shaking during the warming cycle.

If the initial use of the product results in a left over portion, this may be refrozen and at a later time thawed to a fine-grained slush consistency. Even if the left over portion has thawed to the liquid state, it may be refrozen and subsequently thawed to a fine-grained slush.

According to this invention the dry mix does not contain high levels of freezing point depressants such as monosaccharides (e.g., glucose and fructose) and alcohols, as it is not desired to depress the onset melting point of the liquid slush formulation below about −6.5° C. Thus, a slush consistency can be obtained in a relatively short period of time. The dry mix preferably contains at least 70% disaccharides, (e.g., sucrose) and higher saccharides (e.g., dextrins) and preferably contains less than 20% of monosaccharides (e.g., dextrose, fructose) and/or alcohols (e.g., mannitol, sorbitol, xylitol, glycerol, ethanol and the like). Unlike prior art formulations for producing slush beverages, which teach the use of high levels of monosaccharide sugars and/or alcohols, dry mix formulations may be produced in accordance with this invention which do not include any monosaccharide sugars or alcohols and which may derive all sweetness from sucrose.

Control of the ice crystal size within the slush is enhanced by the presence of a water-soluble, low-viscosity, hydrocolloid in the dry mix formulation. Typical use levels for these hydrocolloids in the dry mix is at least 2%, preferably 3–8%, and most preferably 4–6%, of the dry mix. Preferred hydrocolloids will add little or no viscosity to the liquid slush formulation if used at a level of about 5% in the dry mix. These low-viscosity hydrocolloids may be obtained by hydrolysis of higher-viscosity, high-molecular weight polysaccharides gums, such as cellulose gum, guar gum and pectin or by the hydrolysis of gelatin. Hydrolyzed gelatin is a cold-water soluble, non-gelling hydrocolloid, often times referred to as zero bloom gelatin. These hydrolyzed materials will usually have a molecular weight of less than 15,000 Daltons. Other cold-water soluble, rapidly-dispersible, low-viscosity polysaccharides, such as cellulose derivatives, and gum arabic should also be useful. These hydrocolloids may be used alone or in combination. Typically, the low-viscosity polysaccharide gums used in this invention will have a high (e.g. greater than about 70%) soluble fiber content.

A small quantity of insoluble particles which function as points for ice crystal nucleation is preferably included in the mix. The preferred particles are the smallest obtainable, however, from a commercial point of view it has been found that material having an average particle size of less than about 6 microns is suitable when used at a level of about 0.1% by weight of the dry mix. Calcium silicate is a preferred nucleating agent as it is practically insoluble at all pH levels. Other materials, such as magnesium oxide, silica and tricalcium phosphate, may be used provided the conditions (e.g., pH) of the slush formulation do not result in solubilizing the particles.

Other functional ingredients may be included in the dry mix to even further facilitate the development and/or retention of fine ice crystals within the slush. Thus, carbonating salts and/or a foam generator have proven to be useful. Flavor ingredients such as coffee, cocoa, tea, natural and artificial flavor compounds may be included as desired. Food acids, buffers, flow agents, texturizing agents, dispersing agents, color agents, vitamins etc. may be used to provide slushes of varying flavors and textures as will be apparent to skilled food technologists.

Percents given within this disclosure and claims are by weight, unless otherwise indicated.

The freezable water content as used in this invention is determined calorimetrically using DSC (Dual Sample Differential Scanning Calorimeter, Model 912 from Du Pont Instruments, Wilmington, Del.). A given weight of the beverage solution, in a hermetically sealed aluminum pan, is frozen slowly at the rate of 1° C./min. to −30° C. in the DSC, and then slowly heated at the same rate. The area under the DSC peak is a measure of the amount of ice (i.e., freezable water) in the frozen beverage. The onset of melting is also determined from the same DSC curve as ice (in equilibrium with the unfrozen solution) starts to melt on heating the frozen material.

The dry mix is preferably free of alcohols, such as ethanol or glycerol.

It is an object of this invention to produce a dry beverage mix which can be reconstituted into a liquid which may be quickly frozen to a smooth, fine-grained slush in a home freezer.

DESCRIPTION OF PREFERRED EMBODIMENTS

According to this invention a dry mix is prepared preferably containing at least 70%, more preferably 70–95%, dissaccharides and higher saccharides, such as dextrins. Typically the mix will contain at least 70% of sucrose; however, in the case when sugar-free mixes are desired the sucrose component may be replaced by a dextrin, such as a water-soluble maltodextrin having a D.E. less than 15 and/or polydextrose. An intensive sweetener, such as aspartame, acesulfame-K, and the like, will usually be included in such sugar-free mixes.

Fruit-flavored mixes, such as lemon and grape, will typically contain an amount of food acid, usually 3–8%, in order to provide the tart taste associated with these flavors. Mixes formulated to prepare fruit-creamsicle flavored slushes (e.g., orange-creamsicle) when combined with milk will usually contain only a low amount, such as 1–2% of food acid, so that the pH of the system is not incompatible with milk protein.

Coffee-flavored mixes may contain an amount, typically 2–10%, of soluble coffee solids, and tea-flavored mixes may contain an amount, typically 1–5% of soluble tea solids. Chocolate or mocha-flavored mixes will typically contain an amount of cocoa powder, usually 2–15%, which may be dutched and/or lecithinated cocoa.

A preferred ice crystal nucleating agent is calcium silicate. Hubersorb 600™, available from J. M. Huber Corporation (Havre de Grace, Md.) is a suitable material which is reported to have an average particle size of 6.0 microns (as measured by the Microtrac method). The preferred use level for this material is 0.04–0.2%. As noted previously smaller sized material would function effectively at a lower weight level, as the number of particles is the important factor.

A preferred water-soluble, low-viscosity hydrocolloid is an enzyme degradation product of a cellulose derivative, such as sodium carboxymethylcellulose. Such materials are further described in U.S. Pat. No. 5,366,755 which is herein incorporated by reference. These gum materials should have a molecular weight of less than 15,000 Daltons, preferably 1,000–10,000 Daltons, and typically contain about 80% dietary fiber. Such a material is available from Hercules Incorporated (Wilmington, Del.) under the trade name CMC-ENZ. Other water-soluble, low viscosity hydrocolloids should function similarly to promote the formation and maintenance of a fine grained ice crystal structure within the slush. These hydrocolloids should possess a viscosity such that a 2% solution at 20° C. is less than about 50 mPas, preferably less than 25 mPas and most preferably less than 10 mPas.

The presence of carbonating salts in the dry mix has been found to both further facilitate the development of fine grained ice crystals and to provide a pleasant, refreshing, organoleptic effect. The level of salts should not be so great as to provide an adverse flavor impact. Carbonate and bicarbonate salts may be used for this purpose with sodium bicarbonate being a preferred material. As will be apparent to those skilled in the art, as acid component will need to be present to effect release of carbon dioxide, and the acid thus consumed, will not be available for pH effect. A desirable level for carbonating salts is 0.2 to 2%, preferably 0.3–1%.

It has been found desirable, particularly in combination with carbonating salts, to include a foam agent in the dry mix. Natural foam agents such as quillaja extract powder and yucca extract powder would be suitable. Fruit and/or vegetable juice solids would also be a source of natural foam agent. Food-approved, chemical foam agents could also be utilized, provided of course they are in dry form or could be plated on the surface of a mix component, such as sucrose. A suitable chemical foam agent is polyoxyethylene (20) sorbitan monostearate, available in liquid form from ICI Surfactants (Wilmington, Delaware) as Tween® 60. The foam agent is believed to further improve the ice crystal structure/morphology and the refreshment value of the slush.

In order to improve the mouthfeel of the slush, particularly for milk-based slushes, it may be desirable to include a texturizing agent, such as a non-gelling hydrocolloid, in the dry mix. Typical levels would be 0.05–1.0%, preferably 0.1–0.8%. Lambda-carrageenan has been found to be useful for this purpose. Non-gelling polysaccharides, such as xanthan gum, guar gum and gum arabic and cellulose derivatives that do not gel in cold water, which are fully soluble and/or dispersible in cold water or milk, would also be useful.

Dispersing agents such as lecithin, preferably a low-viscosity lecithin; will be useful in the dry mix, particularly for milk-based slushes. The lecithin may be coated onto the surface of a major ingredient, such as sucrose or cocoa, in order to obtain high efficiency from the use of this material.

As will be apparent, functional ingredients such as vitamins, minerals and antioxidants could be included in the dry mix. It would also be possible to formulate the dry mix such that the slush is a source of fiber. A suitable technique would be the use of a reduced-calorie maltodextrin having a high soluble fiber content, such as in the formulation of a sugar-free dry mix. A useful ingredient is Fibersol®, a product of Matsutami Chemical Industry Co., Ltd. (Itami City, Japan), which is a cold-water soluble, agglomerated maltodextrin having an average D.E. of 8 and a high soluble fiber content.

As noted previously the dry mixes of this invention may be formulated for use with water and/or milk. Mixes designed for use exclusively with milk may, when prepared with milk, have a solids content in excess of 20%, typically 20–30%, and may even have a viscosity above 15 mPas at 14.7° C.; however, these mixes when prepared with water at a 15% solids level should still have a viscosity of less than 15, preferably less than 10 mPas at 14.7° C. and an onset melting point of greater than −6.5° C.

This invention is further described, but not limited by the following examples.

EXAMPLE 1

A dry mix for preparing a lemon-flavored slush beverage was produced by blending the following ingredients:

| Ingredients | Parts by Weight |
| --- | --- |
| Granular Sucrose | 73.65 |
| Crystalline Fructose | 13.0 |
| Fine Granular Citric Acid | 6.1 |
| Sodium Carboxymethylcellulose | 5.0 |
| Lemon Flavor/Color/Flavor Enhancer | 0.69 |
| Sodium Bicarbonate | 0.51 |
| Disodium and Trisodium Phosphate | 0.50 |
| Cloud/Vitamin C/Juice Solids | 0.37 |
| Magnesium Oxide/Calcium Silicate | 0.34 |
| Quaillaja Extract Powder | 0.05 |

150 grams of the dry mix was placed in a container and 3.5 cups (830 ml) of cold water was added. The container was covered and shaken until the mix was dissolved. The covered container was then placed in the freezer compartment of a household refrigerator for two hours. The container was then removed from the freezer, shaken to break up the frozen mixture and then returned to the freezer for about 30 minutes or until the mixture is thick and slushy. The resulting semi-fluid mix had a smooth consistency and could be spooned into serving containers.

EXAMPLE 2

A dry mix for preparing a lemonade-flavored slush beverage was produced by dry blending the following ingredients:

| Ingredients | Parts by Weight |
| --- | --- |
| Granular Sucrose | 74.11 |
| Crystalline Fructose | 13.07 |
| Citric Acid | 5.73 |
| Sodium Carboxymethylcellulose (CMC ENZ) | 5.24 |
| Sodium Bicarbonate | 0.53 |
| Calcium Silicate (avg. particle size 6 microns) | 0.10 |
| Quaillaja Extract Powder | 0.05 |
| Trisodium Citrate (buffer) | 0.14 |
| Magnesium Oxide (flow agent) | 0.31 |
| Flavor/Color/Cloud/Vitamin C/Juice Solids | 0.68 |

143 grams of the mix were stirred to dissolve with 3.5 cups (826 ml) of cold tap water in a bowl. The resulting liquid contained 14.7% solids had a viscosity at 14.7° C. of about 1.95 mPas, a pH of 3.66 and an onset melting point of −4.12° C. (24.6° F.). The freezable water content of the liquid was about 71.2%. This liquid was suitable for consumption as a beverage.

The bowl was covered and placed in a household freezer with the mixture being removed from the freezer and stirred after about one hour. After a total of about 3.5 hours the mixture was removed from the freezer, stirred and spooned into cups for serving. The slush had a soft, fine-grained ice crystal consistency and was judged to be pleasant tasting and refreshing. Upon being allowed to warm for a few minutes, the slush could be consumed through a straw.

A remaining portion of the slush was returned to the freezer in the bowl where it remained for at least 24 hours. Upon removal from the freezer, the fully-frozen slush was allowed to stand in the bowl at room temperature until softened and then stirred. A soft, fine-grained ice crystal consistency was again obtained. In lieu of room-temperature thawing, the fully-frozen slush was placed uncovered in a microwave set on high. A two-cup quantity thawed to a soft, fine-grained ice crystal consistency within 1 to 2 minutes. The ice was broken up into small pieces halfway through the microwave cycle and at the end of the microwave cycle the slush was stirred.

The slush could be fully thawed to the liquid state and refrozen to again obtain a soft, fine grained ice crystal consistency.

The dry mix of this Example prepared, as above, but without the sodium silicate component, produced a desirable slush, but was not as preferred among some tasters.

Using the dry mix and procedures of this Example 2, slushes were prepared from liquids containing 20%, 25% and 30% solids, respectively. As the solids level increased, the onset melting point of the liquid decreased slightly, there was a short delay in achieving optimum slush consistency and the percent freezable water decreased. The ice crystal structure was, however, at least as desirable as the slush containing 14.7% solids.

Modifying the dry mix of Example 2, by replacing the sodium carboxymethylcellulose with cold-water dispersible gum arabic (i.e., Prehydrated Gum Arabic from TIC Gums, Inc. Belcamp, Md.) at the 50% and 100% levels, and using the procedure of Example 2, produced slushes having a desirable ice crystal structure comparable to that of Example 2.

EXAMPLE 3

A dry mix for a French Vanilla-flavored, coffee slush was prepared with the ingredients listed below. The sugar was coated with liquid lecithin in a Hobart™ mixing bowl and then the remaining ingredients were blended (about 15 minutes) until a lump-free homogenous mixture was obtained:

| Ingredients | Parts by Weight |
| --- | --- |
| Granular Sucrose | 86.61 |
| Spray-Dried Soluble Coffee | 5.61 |
| Sodium Carboxymethylcellulose (CMC-ENZ) | 5.26 |
| Trisodium Citrate | 1.12 |
| Lambda Carrageenan | 0.35 |
| Calcium Silicate | 0.11 |
| Liquid Lecithin | 0.20 |
| French Vanilla Flavor | 0.74 |

81.45 grams of the dry mix was dissolved in 472 ml (2 cups) of 2% fat, cold milk (11% solids). The liquid had a solid content of about 24%, a pH of 6.76, an average viscosity reading (at 14.7° C.) of about 4.1 mPas, an average onset melting point of −3.7° C. (25.34° F.), and a freezable water content of about 68.5%. The liquid was consumable as a beverage and when frozen as a slush in the manner described in Example 2, resulted in a soft, fine-grained ice crystal structure comparable to the slush of Example 2. The slush of this Example has a creamy texture due to the presence of milk and the lambda carrageenan. Combining the same amount of the dry mix with water rather than milk produced a liquid having a solids content of 14.7% and a slush having the equivalent ice crystal structure but without a creamy texture.

EXAMPLE 4

The dry ingredients listed below were blended to produce a tea-flavored, slush beverage mix:

| Ingredients | Parts by Weight |
| --- | --- |
| Granular Sucrose | 74.47 |
| Crystralline Fructose | 12.71 |
| Sodium Carboxymethylcellulose (CMC-ENZ) | 5.24 |
| Citric Acid | 2.72 |
| Instant Tea | 2.66 |
| Sodium Bicarbonate | 0.53 |
| Calcium Silicate | 0.10 |
| Magnesium Oxide (flow agent) | 0.08 |
| Quillaja Extract Powder | 0.05 |
| Tea Flavor/Lemon Flavor/Color | 0.41 |

143.12 grams of the dry mix were dissolved in 826 ml (3.5 cups) of cold tap water resulting in a liquid having a solid content of 14.8% and which was consumable as a beverage. When the liquid was converted to a slush as in Example 1, the resulting slush has a refreshing, tea flavor and functioned as described in Example 2.

EXAMPLE 5

A sugar-free, strawberry-daiquiri-flavored dry mix for a slush beverage was prepared by dry blending the following ingredients:

| Ingredients | Parts by Weight |
| --- | --- |
| Maltodextrin (8DE, 81% soluble fiber-HPLC method) | 76.58 |
| Crystalline Xylitol | 13.92 |
| Sodium Carboxymethylcellulose (CMC-ENZ) | 5.22 |
| Citric Acid | 2.65 |
| Sodium Bicarbonate | 0.52 |
| Aspartame | 0.33 |
| Potassium Citrate (buffer) | 0.07 |
| Calcium Silicate | 0.07 |
| Magnesium Oxide (flow agent) | 0.05 |
| Quillaja Extract Powder | 0.05 |
| Flavor/Color/Cloud | 0.55 |

143.65 grams of the mix is dissolved in 826 ml (3.5 cups) of cold tap water resulting in a liquid having a solids content of 14.8%, a viscosity (at 16° C.) of about 2.5 mpas, a pH of 4.08, a mean onset melting point of −2.64° C. (27.2° F.), and a freezable water content of about 75.5%. The liquid was consumable as a beverage and on freezing for about 3.5 hours as in Example 2, resulted in a soft, fine-grained ice crystal slush comparable to that of Example 2.

EXAMPLE 6

A chocolate-flavored slush beverage mix was prepared by dry blending the following ingredients:

| Ingredients | Parts by Weight |
| --- | --- |
| Granular Sucrose | 81.15 |
| Cocoa Powder, Lecithinated | 12.06 |
| Sodium Carboxymethylcellulose (CMC-ENZ) | 5.00 |
| Lambda Carrageenan | 0.75 |
| Calcium Silicate | 0.10 |
| Salt/Flavor | 0.98 |

80 grams of the mix was dissolved in 472 ml (2 cups) of cold 2% fat milk producing a liquid having a solids content of about 24% and was consumable as a chocolate beverage. When frozen for about 3.5 hours, as in Example 2 the resulting slush had a soft, fine-grained ice crystal structure comparable to Example 2 and had a creamy texture.

EXAMPLE 7

An orange-creamsicle flavored slush beverage mix was prepared by dry-blending the following ingredients:

| Ingredients | Parts by Weight |
| --- | --- |
| Granular Sucrose | 91.08 |
| Sodium Carboxymethylcellulose (CMC-ENZ) | 4.88 |
| Citric Acid | 1.30 |
| Sodium Bicarbonate | 0.50 |
| Magnesium Oxide | 0.30 |
| Lambda Carrageenan | 0.10 |
| Calcium Silicate | 0.10 |
| Quillaja Extract Powder | 0.05 |
| Flavor/Color/Vitamin C | 1.68 |

153.7 grams of the mix were dissolved in 826 ml (3.5 cups) of cold 2% fat milk resulting in a liquid having a solids content of about 25%. The resulting liquid was consumable as a beverage and when frozen as per Example 2 resulted in a soft, fine-grained ice crystal slush comparable to Example 2 and having a creamy texture.

What is claimed is:

1. A slush beverage dry mix capable of being combined with water or milk and frozen to produce a slush beverage within about 3.5 hours in a household freezer, the dry mix when dissolved in water at about 15% solids level producing a liquid which has an onset melting point greater than −6.5° C. and a viscosity of less than 15 mPas at 14.7° C., and wherein said dry mix contains at least 2% of water-soluble hydrolyzed hydrocolloid, wherein a 2% solution of said hydrocolloid has a viscosity of less that 10 mPas at 20° C.

2. The dry mix of claim 1 which contains at least 70% by weight of disaccharides and higher saccharides and less than 20% by weight of monosaccharides and sugar alcohols.

3. The dry mix of claim 1 wherein the liquid has a freezable water content of at least 70%.

4. The dry mix of claim 1 wherein the hydrolyzed hydrocolloid is a hydrolyzed polysaccharide gum having a molecular weight of less than 15,000 Daltons.

5. The dry mix of claim 4 wherein the polysaccharide gum is a cellulose gum.

6. The dry mix of claim 5 wherein the cellulose gum is a carboxymethylcellulose gum.

7. The dry mix of claim 1 which contains about 0.1% by weight of insoluble particles having an average particle size of 6 microns or less and effective to function as an ice crystal nucleating agent.

8. The dry mix of claim 7 wherein the ice crystal nucleating agent is calcium silicate and the dry mix additionally includes a flow agent which will solubilize.

9. The dry mix of claim 1 which contains carbonating-salt at a level of 0.3 to 1% by weight.

10. The dry mix of claim 9 wherein the carbonating salt is sodium bicarbonate.

11. The dry mix of claim 1 which contains a foam agent.

12. The dry mix of claim 11 which contains from 0.01–0.2% of a natural foam agent.

13. The dry mix of claim 12 wherein the natural foaming agent is quillaja extract powder yucca extract powder or combinations thereof.

14. The dry mix of claim 1 wherein the mix is intended to be reconstituted with milk, and wherein the dry mix contains from 0.005 to 0.1% by weight of a texturizing hydrocolloid.

15. The dry mix of claim 14 wherein the texturizing hydrocolloid is lambda carrageenan.

16. The dry mix of claim 1 wherein no monosaccharide sugars or sugar alcohols are included.

17. The dry mix of claim 16 wherein sucrose is present at a level of at least 90%.

* * * * *